CONTROLLABLE ASYMMETRIC ELECTRICAL CONDUCTOR SYSTEMS

Filed April 14, 1953

Inventors
Werner Koch
Hans-Ulrich Harten
Reiner Thedieck
by: Michael S. Striker
Attorney United States Patent Office 2,842,723

Patented July 8, 1958

2,842,723

CONTROLLABLE ASYMMETRIC ELECTRICAL CONDUCTOR SYSTEMS

Werner Koch, Hans-Ulrich Harten, and Reiner Thedieck, Belecke (Mohne), Germany, assignors to Licentia Patent-Verwaltungs-G. m. b. H., Hamburg, Germany Application April 14, 1953, Serial No. 348,728

Claims priority, application Germany April 15, 1952

6 Claims. (Cl. 317—235)

The present invention relates to electrical conductor arrangements, and more particularly to arrangements involving controllable electrical asymmetric conductors, i. e., electrically unsymmetrically conductive devices.

It is an object of this invention to provide an electrical conductor arrangement which will exhibit as nearly as possible unifrom characteristics upon manufacture thereof.

It is another object of this invention to provide an arrangement which results in uniform contact resistance, independent of size and placement of a main electrode on a transformation zone.

It is another object of the present invention to provide an electrode arrangement such that the size and position of a main electrode on a transformation zone, is relatively unimportant.

In one from of the invention a controllable asymmetric electrical structure comprises a semi-conductor body having a top surface, a carrier electrode connected to the semi-conductor body, the carrier electrode consisting as nearly as posible of a barrier layer-free substance, a conductor having a top surface and arranged on the semi-conductor body with the top surface thereof in line with the top surface of the conductor, the conductor having different characteristics than that of the semi-conductor body, a main electrode arranged on the top surface of the conductor, the main electrode consisting of a barrier layer-free substance, and a control electrode spaced from the conductor and connected to the top surface of the semi-conductor body, the control electrode being closer to the conductor than the carrier electrode.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
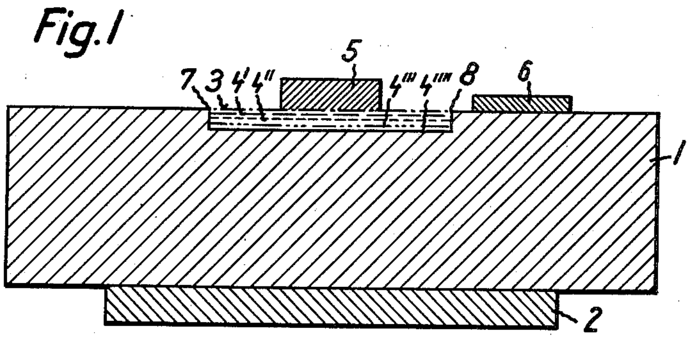
Fig. 1 shows schematically in section one of the embodiments in accordance with the present invention.

Referring to the arrangement of Fig. 1, there is shown an n-conductor germanium crystal body 1. Between the points 7 to 8 a layer 4', or multiple layers 4' to 4''''', is embedded in the top surface of the germanium crystal body. The layer zone 4' to 4''''' comprises a p-conductor surface region portion which has different conductivity characteristics from the germanium crystal body 1. This difference is particularly noted if two probes spaced at a distance of 0.1 mm. are placed on the top surface 3 of the p-conductor, and the resistance between the two probes is measured. The approximate resistance will be found to be in the vicinity of 200 ohms. The measurement noted between the two probes exhibits a current voltage characteristic curve having a resistance character. If, subsequent to this measurement, the tips of the probes are again placed 0.1 mm. apart and somewhat to the left of point 7 so that the probes are not in contact with the transformation zone 4' to 4''''', a resistance of approximately $10^4$ to $10^5$ ohms will be noted, and which is not of a resistance character. The reason for this is that when a probe is placed at the upper surface of the germanium n-conductor a rectification action will be noted, and when both probe points are placed on the top surface, opposing rectifying action will be noted resulting in a blocking resistance.

On the p-conductor is arranged a main electrode 5 consisting as nearly as possible of a barrier layer-free substance. As noted in Fig. 1, the main electrode 5 is smaller than the horizontal surface 3 of the p-conductor zone. The main electrode's position on the p-layer can be arranged as desired. The semi-conductor body 1 is arranged on a carrier electrode 2. The carrier electrode should consist as nearly as possible of a barrier layer-free substance.

Close to the boundary 7, 8, in the p-conductor zone a physical dividing line is formed in known manner which consists of a negative space charge in the p-conductor portion and a positive space charge in the n-conductor portion. In the arrangement in accordance with the invention the fact is utilized that the size and position of the main electrode 5 on the surface of the p-conductor 3 is not important if the main electrode 5 is made sufficiently large. In this manner the currents to be transferred may be controlled without experiencing any disturbing effect on the contact resistance.

Outside of the p-layer, to the right of point 8 a control electrode 6 is provided which makes contact with the top surface of the semi-conductor body 1 and is spaced from the p-layer zone. The control electrode is arranged closer to the p-layer zone than the carrier electrode 2.

The thickness of the transformation or p-layer zone is chosen so that the layers are smaller than the semi-conductor body extending in the same direction. It will be of particular advantage to choose the thickness of the layers so that it is approximately one-half the physical extent of the semi-conductor body in the same direction. One thickness of the transformation zone should be preferably between the limits of $1\times10^{-3}$ mm. and .5 mm. It will also be of advantage if the thicknesses were chosen to lie within the range of from $1\times10^{-3}$ mm. to $50\times10^{-3}$ mm.

The main electrode 5 and the control electrode 6 can be arranged, with advantage, on the same geometric surface of the semi-conductor body, and in relation to the carrier electrode may be arranged either on diametrically opposite surfaces of the semi-conductor body or with all three electrodes on the same surface thereof.

The carrier electrode can be in the form of a cap or a ring in which case the main electrode and the carrier electrode will be similarly in the form of a ring.

Preferably the distance between the control electrode and the edge of the transformation zone should be, at minimum, the same magnitude as the total thickness of the layers. It is also of advantage, however, to arrange the control electrode so that it is at least three times the thickness of the p-layers. The smallest distance between the main electrode and control electrode should be of the order of 0.3 mm.

Preferably the semi-conductor body is composed of semi-conductive material, especially composed of an n-conductor germanium crystal whose outer layer has a comparatively large p-conductor zone. In accordance with the invention the p-conductor zone can be arranged in an overlapping manner. The transformation can be accomplished by application of heat for a short duration followed by rapid cooling. The short heating period may be obtained by means of current impulses with the use of a small tipped elctrode in combination with a second larger tipped electrode. The current impulses can be of alternating current impulse form of any desired frequency, or even the charge accumulated by a condenser. If desired, a direct current pulse may also be used. Electric arcs to the semi-conductor surface have also been used. These arcs may be employed with a protective gas. The short heating period may also be accomplished by an electron stream having a cross section approximately equal to the cross-section of the surface to be treated. Or, if desired, a sharp beam may be employed, which is scanned over a surface to be transformed.

Figure 2:
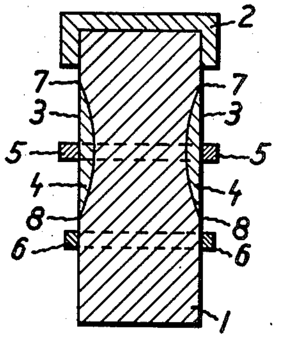
Fig. 2 shows a sectional view of a second embodiment in accordance with the present invention.

Referring now to Fig. 2 another embodiment is shown in section in accordance with the present invention. The semi-conductor body 1, in this embodiment, is of cylindrical form. The carrier electrode 2 is in the form of a cap. A transformation zone 4 (which may be composed of layers) is arranged on the surface of the semi-conductor body 1, this zone having a different conductivity characteristic than that of the semi-conductor body 1. In this particular embodiment the main and the control electrodes are both formed as rings, the main electrode being connected to the zone 4 while the control electrode is connected about the semi-conductor body 1 spaced from the zone 4.

Figure 3:
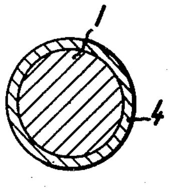
Figs. 3, 4 and 5 show, respectively, a semi-conductor body and a transformed zone of circular square and rectangular cross-section of an arrangement similar to Fig. 2, the section being taken at approximately the height of the main electrode.
Figure 4:
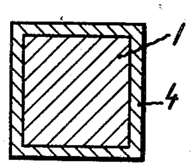
Figure 5:
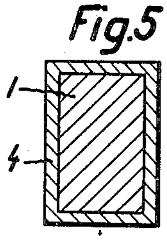

Figs. 3, 4 and 5 are cross sections of an arrangement which is similar to that shown in Fig. 2, the cross section being taken in the proximity of the main electrode 5. It will be noted in each of these cross sections that the zone 4′ to 4‴ is of the same cross section as the semi-conductor body and completely encompasses the same. The zone 4′ to 4‴ may extend if desired, along the entire length of the semi-conductor body 1.

Figure 6:
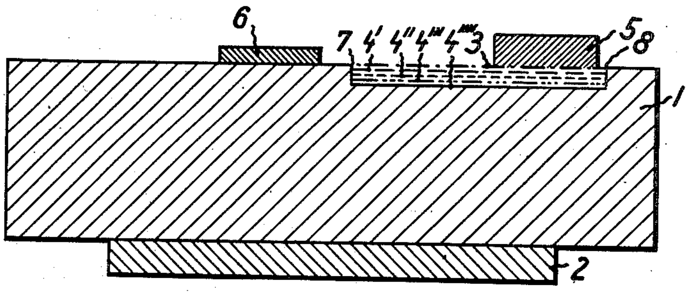
Fig. 6 shows a sectional view of yet another embodiment in accordance with the present invention.

Fig. 6 illustrates another embodiment in accordance with the invention wherein the positions of electrodes 5 and 6 have ben reversed. The transformed zone between the regions 7 and 8 is particularly large as compared with its thickness. Also noteworthy is the increased distance between the main electrode and the control electrode. The control electrode should be connected to the semi-conductor body as close as possible to the region of the p-conductor layer. It does not matter on which side of the p-conductor region the control electrode is arranged. As noted in Fig. 1 the control electrode is arranged to the right of point 7, whereas in Fig. 6 it is to the left thereof. This last fact together with those already enunciated, namely, that the size and the position of the main electrode on the surface of the p-layer is not important providing the size of the main electrode is made sufficiently large, gives rise to an advantageous arrangement not heretofore appreciated. As a result this invention makes possible the arrangement of the main and control electrodes at greater distances than has been possible up to the present time.

It is possible to change the resistance of the barrier layer with the control electrode 6 by permitting the flow of a small directed current from the control electrode 6 to the semi-conductor body 1 or the carrier electrode 2 and by varying the extent of such current flow in accordance with a predetermined control voltage.

It will be understood that each of the elements described above, or two or more together, may also find a useful application in other types of electrical conductors differing from the types described above.

The forementioned term "electrode consisting as nearly as possible of a barrier layer-free substance" means that no or nearly on barrier layer exists between the electrode-substance and the semi-conductor-substance.

What is claimed as new and desired to be secured by Letters Patent is:

1. A controllable electrically unsymmetrically conductive device, comprising, in combination, a semi-conductor unit composed of two semi-conductor portions each forming part of the outer surface of said semi-conductor unit, one of said portions being p-conductive and the other of said portions being n-conductive, one of said portions being in the form of a hollow body and at least partially encircling the other of said portions; a first main electrode on a portion of the outer surface of one of said semi-conductor portions of said semi-conductor unit being spaced from the other semi-conductor portion of said semi-conductor unit; a second main electrode on the surface of said other semi-conductor portion of said semi-conductor unit; and an additional electrode on the surface of said one semi-conductor portion of said semi-conductor unit located nearer to said other semi-conductor portion of said semi-conductor unit than said first main electrode.

2. A controllable electrically unsymmetrically conductive device, comprising, in combination, a semi-conductor unit composed of two semi-conductor portions each forming part of the outer surface of said semi-conductor unit, one of said portions being p-conductive and the other of said portions being n-conductive, one of said portions being in the form of a hollow body and at least partially encircling the other of said portions, said portions having a circular cross section; a first main electrode on a portion of the outer surface of one of said semi-conductor portions of said semi-conductor unit being spaced from the other semi-conductor portion of said semi-conductor unit; a second main electrode on the surface of said other semi-conductor portion of said semi-conductor unit; and an additional electrode on the surface of said one semi-conductor portion of said semi-conductor unit located nearer to said other semi-conductor portion of said semi-conductor unit than said first main electrode.

3. A controllable electrically unsymmetrically conductive device, comprising, in combination, a semi-conductor unit composed of two semi-conductor portions each forming part of the outer surface of said semi-conductor unit, one of said portions being p-conductive and the other of said portions being n-conductive, one of said portions being in the form of a hollow body and at least partially encircling the other of said portions, said portions having a square cross section; a first main electrode on a portion of the outer surface of one of said semi-conductor portions of said semi-conductor unit being spaced from the other semi-conductor portion of said semi-conductor unit; a second main electrode on the surface of said other semi-conductor portion of said semi-conductor unit; and an additional electrode on the surface of said one semi-conductor portion of said semi-conductor unit located nearer to said other semi-conductor portion of said semi-conductor unit than said first main electrode.

4. A controllable electrically unsymmetrically conductive device, comprising, in combination, a semi-conductor unit composed of two semi-conductor portions each forming part of the outer surface of said semi-conductor unit, one of said portions being p-conductive and the other of said portions being n-conductive, one of said portions being in the form of a hollow body and at least partially encircling the other of said portions, said portions having a rectangular cross section; a first main electrode on a portion of the outer surface of one of said semi-conductor portions of said semi-conductor unit being spaced from the other semi-conductor portion of said semi-conductor unit; a second main electrode on the surface of said other semi-conductor portion of said semi-conductor unit; and an additional electrode on the surface of said one semi-conductor portion of said semi-conductor unit located nearer to said other semi-conductor portion of said semi-conductor unit than said first main electrode.

5. A controllable electrically unsymmetrically conductive device comprising, in combination, a semi-conductor body composed of a surface region portion adjacent one face of said semi-conductor body and a main body portion constituting the remainder of said semi-conductor body, one of said portions being p-conductive and the other of said portions being n-conductive; a first main electrode on a face of said semi-conductor body spaced from said surface region portion of said semi-conductor body and being mounted on said semi-conductor body without any blocking layer between itself and said semi-conductor body, said first main electrode being in the form of a cap; a second main electrode on said surface region portion of said semi-conductor body, mounted on the same without any blocking layer between itself and said surface region portion of said semi-conductor body; and an additional electrode on the surface of said semi-conductor body located nearer to said surface region portion of said semi-conductor body than said first main electrode, said second main electrode and said additional electrode being ring-shaped.

6. A controllable electrically unsymmetrically conductive device comprising, in combination, a semi-conductor body composed of a surface region portion adjacent one face of said semi-conductor body and a main body portion constituting the remainder of said semi-conductor body, one of said portions being p-conductive and the other of said portions being n-conductive; a first main electrode on a face of said semi-conductor body spaced from said surface region portion of said semi-conductor body and being mounted on said semi-conductor body without any blocking layer between itself and said semi-conductor body, said first main electrode being in the form of a ring; a second main electrode on said surface region portion of said semi-conductor body, mounted on the same without any blocking layer between itself and said surface region portion of said semi-conductor body; and an additional electrode on the surface of said semi-conductor body located nearer to said surface region portion of said semi-conductor body than said first main electrode, said second main electrode and said additional electrode being ring-shaped.

References Cited in the file of this patent

UNITED STATES PATENTS

| | | |
|---|---|---|
| 2,560,594 | Pearson | July 17, 1951 |
| 2,561,411 | Pfann | July 24, 1951 |
| 2,563,503 | Wallace | Aug. 7, 1951 |
| 2,563,504 | Pfann | Aug. 7, 1951 |
| 2,586,080 | Pfann | Feb. 19, 1952 |
| 2,597,028 | Pfann | May 20, 1952 |
| 2,600,500 | Haynes et al. | June 17, 1952 |
| 2,603,694 | Kircher | July 15, 1952 |
| 2,604,496 | Hunter | July 22, 1952 |
| 2,629,672 | Sparks | Feb. 24, 1953 |
| 2,691,736 | Haynes | Oct. 12, 1954 |
| 2,709,232 | Thedieck | May 24, 1955 |
| 2,725,315 | Fuller | Nov. 29, 1955 |
| 2,740,076 | Mathews et al. | Mar. 27, 1956 |